United States Patent
Spiers et al.

(10) Patent No.: US 8,118,062 B2
(45) Date of Patent: Feb. 21, 2012

(54) PLEATED WASHER SPRING FOR FUEL PRESSURE REGULATOR

(75) Inventors: Dean Leigh Spiers, Yorktown, VA (US); Harish Domala, Yorktown, VA (US)

(73) Assignee: Continental Automotive Systems US, Inc., Auburn Hills ( * ) Notice: Subject to any disclaimer, the term of this patent is extended or adjusted under 35 U.S.C. 154(b) by 348 days.

(21) Appl. No.: 12/289,653

(22) Filed: Oct. 31, 2008

(65) Prior Publication Data

US 2009/0108222 A1   Apr. 30, 2009

Related U.S. Application Data

(60) Provisional application No. 60/984,080, filed on Oct. 31, 2007.

(51) Int. Cl.
*F15D 1/02* (2006.01)
(52) U.S. Cl. ............................... 138/43; 138/45; 138/46
(58) Field of Classification Search ............ 138/43, 138/45, 46
See application file for complete search history.

(56) References Cited

U.S. PATENT DOCUMENTS

| | | | | | |
|---|---|---|---|---|---|
| 2,730,155 | A | * | 1/1956 | Knohl | 411/165 |
| 2,905,288 | A | * | 9/1959 | Runde | 52/160 |
| 3,322,145 | A | * | 5/1967 | Prosser | 137/517 |
| 3,367,362 | A | * | 2/1968 | Hoffman | 137/517 |
| 3,483,888 | A | * | 12/1969 | Wurzel | 137/539 |
| 3,799,132 | A | * | 3/1974 | MacGuire | 123/587 |
| 4,480,784 | A | * | 11/1984 | Bennett | 236/93 B |
| 4,821,954 | A | * | 4/1989 | Bowder | 236/48 R |
| 4,887,637 | A | * | 12/1989 | Ketner | 137/504 |
| 7,111,639 | B2 | | 9/2006 | McIntyre et al. | |
| 2006/0108006 | A1 | | 5/2006 | Wynn, Jr. | |
| 2008/0277009 | A1 | * | 11/2008 | Sprague | 138/38 |

* cited by examiner

*Primary Examiner* — James Hook

(57) ABSTRACT

A spring-actuator assembly (10) is provided for a fuel pressure regulator. The assembly includes a housing (30) and a washer spring (10) received in the housing. The washer spring has a body (12) with a top surface (13) and a bottom surface (15). The body includes an opening (14) there-through and a plurality of pleats (16, 16') therein so that that first faces (20) of the top surface are disposed on a plane that is different from a plane of second faces (22) of the top surface. At least certain first faces define contact points (24). The assembly also includes an actuating member (26) disposed at least partially in the opening and engaging the contact points of the certain first faces such that a fluid flow passage (36) are defined between the washer spring and the actuating ball for dampening.

17 Claims, 2 Drawing Sheets

PLEATED WASHER SPRING FOR FUEL PRESSURE REGULATOR

This application claims the benefit of the earlier filing date of U.S. Provisional Application No. 60/984,080, filed on Oct. 31, 2007, which is incorporated by reference herein in its entirety.

FIELD OF THE INVENTION

This invention relates to a pressure regulator for automotive fuel systems, and more particularly to a pleated washer spring of a regulator that dampens noise associated with high fuel flow rates through the pressure regulator.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators that control the pressure of the fuel in the system at all engine r.p.m. levels.

Fuel flow rate, measured in liters per hour, through known pressure regulators tends to be low at high engine speed, measured in revolutions per minute, as large quantities of fuel are consumed in the combustion process. At low engine speeds, less fuel is consumed in combustion and flow rates through the pressure regulators are high. These high fuel flow rates can produce unacceptably high noise and pressure levels.

There is a need for a spring-actuator assembly of a pressure regulator that maintains flow-related noise and pressure within acceptable levels, even at high fuel flow rates.

SUMMARY OF THE INVENTION

An object of an embodiment is to fulfill the need referred to above. In accordance with the principles of the present invention, this objective is achieved by spring-actuator assembly for a fuel pressure regulator. The assembly includes a housing and a washer spring received in the housing. The washer spring has a body with a top surface and a bottom surface. The body includes an opening there-through and a plurality of pleats therein so that that first faces of the top surface are disposed on a plane that is different from a plane of second faces of the top surface. At least certain first faces define contact points. The assembly also includes an actuating member disposed at least partially in the opening and engaging the contact points of the certain first faces such that a fluid flow passage are defined between the washer spring and the actuating ball for dampening.

In accordance with another aspect of an embodiment, a spring-actuator assembly for a fuel pressure regulator includes a housing and a washer spring received in the housing. The washer spring has a body including an opening there-through. The body includes plurality of pleats therein and the body defines contact points. The assembly also includes an actuating member disposed at least partially in the opening and engaging the contact points so that fuel flow passages are defined adjacent to the contact points between the actuating member and the washer spring for dampening.

In accordance yet another aspect of an embodiment, a washer spring includes a body with a top surface and a bottom surface. The body includes an opening there-through. A plurality of pleats are provided in the body so that that first faces of the top surface are disposed on a plane that is different from a plane of second faces of the top surface.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
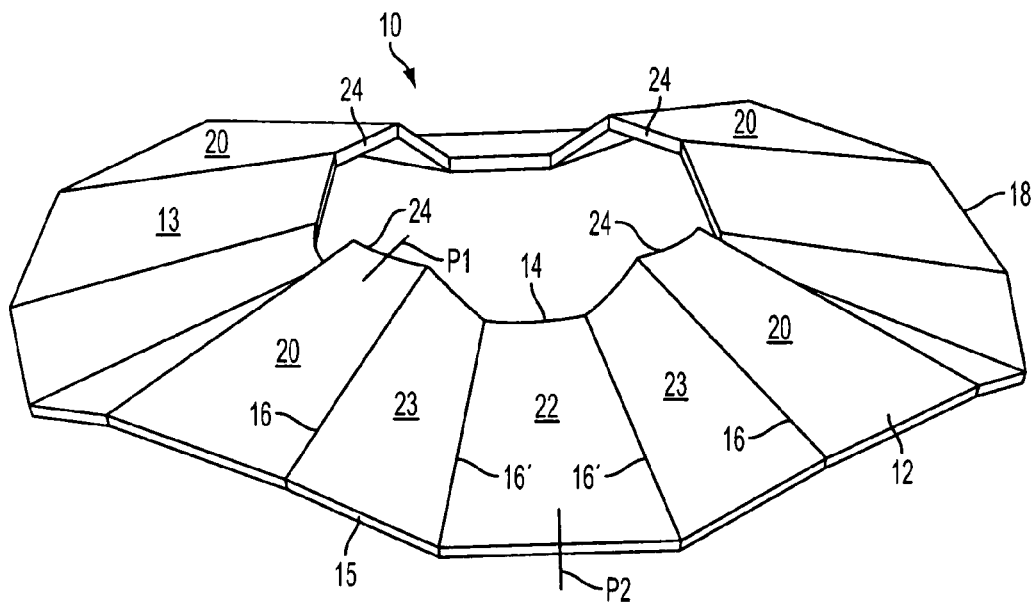
FIG. 1 shows a side view pleated Bellville type washer spring in accordance with an embodiment.
Figure 2:
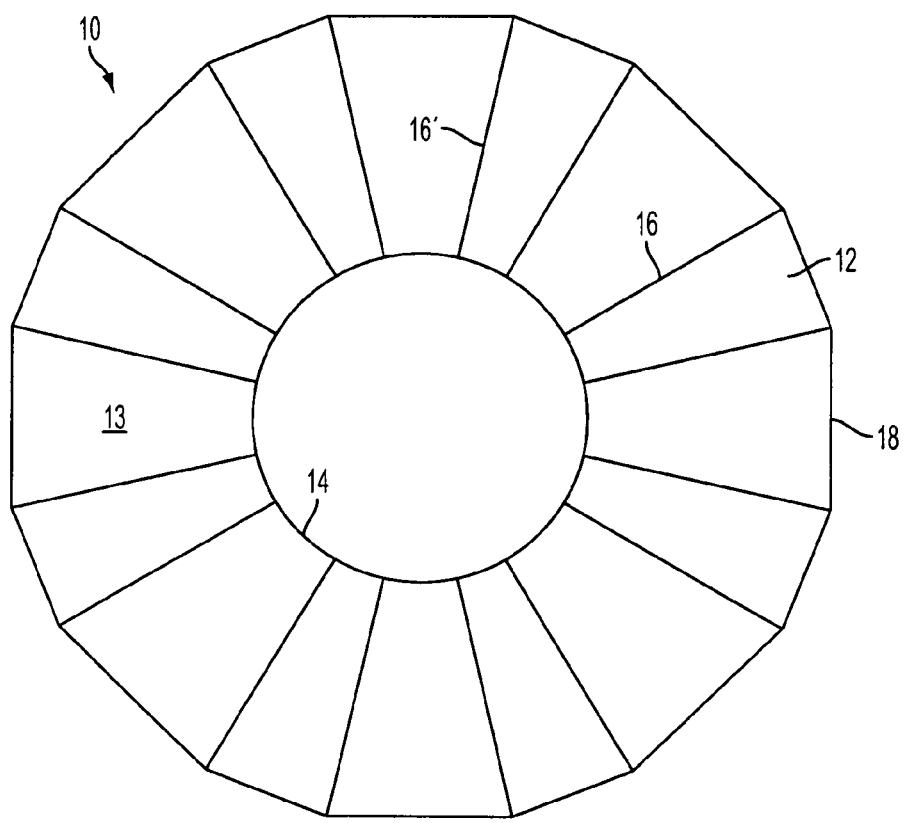
FIG. 2 shows a top view of the washer spring of FIG. 1.

With reference to FIG. 1, a pleated Bellville type washer spring is shown, generally indicated at 10, in accordance with an embodiment of the invention. The washer spring 10 is employed in a fuel pressure regulator associated with a fuel rail as will be explained more fully below. As best seen in FIG. 2, the washer spring 10 has a generally annular body 12 of sheet material having a top surface 13 and a bottom surface 15, opposite the top surface 15. The body 12 has a central opening 14, the function of which will be explained below. A plurality of pleats 16, 16' are provided in the body 12 that extend radially from an outer periphery 18 of the body 12 to the opening.

As best shown in FIG. 1, certain pleats 16 are formed from the bottom surface 15 while other pleats 16' are formed from the top surface 13 in such a manner to ensure that certain first faces 20 of the top surface 13 are disposed on a plane P1 that is different from a plane P2 of certain second faces 22 of the top surface 13. A transition third face 23 is defined between each first and second face. In the embodiment, there are four faces 20 that define four contact points 24 with an actuating member 26. Three of the contact points 24 are seen in FIG. 3.

Figure 3:
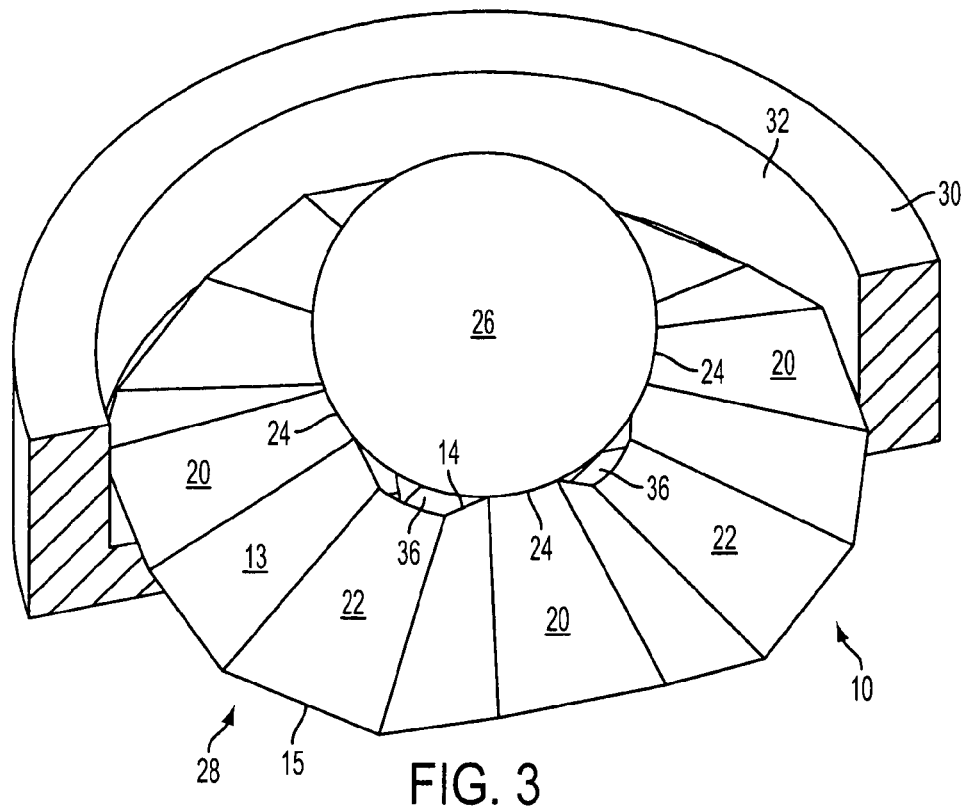
FIG. 3 shows a spring-actuator assembly including housing (partially shown) receiving the washer spring of FIG. 1 and with an actuator ball of a pressure regulator associated with the washer spring.
Figure 4:
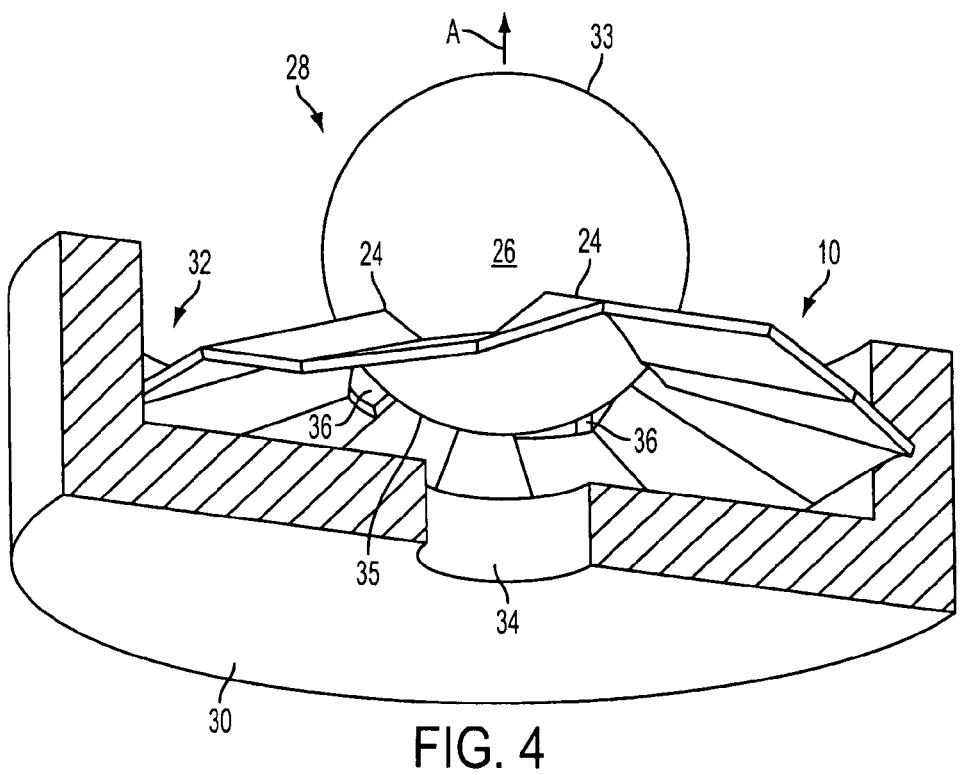
FIG. 4 shows a side view of spring-actuator assembly of FIG. 3.

FIGS. 3 and 4 shows a spring-actuator assembly, generally indicated at 28, that includes a housing 30 (only partially shown) that receives the washer spring 10 in an interior portion 32 thereof. The housing 30 is constructed and arranged to be employed in a fuel pressure regulator, as explained more fully below. The actuating member is preferably in the form of a sphere or ball and is disposed at least partially in the opening 14, and engaging the contact points 24 of the washer spring 10. The spring actuator assembly 28 can be employed in a fuel pressure regulator for a fuel rail of a vehicle, preferably of the type described in U.S. Pat. No. 7,111,639, the contents of which is hereby incorporated into this specification. Thus, a valve seat (not shown) is associated with the surface 33 of the actuating ball 26 that is opposite the surface 35 of the actuating ball 26 that engages the contact points 24.

When the spring-actuator assembly 28 is employed in a regulator of the type described U.S. Pat. No. 7,111,639, fuel enters the housing 30 via opening 34 in the housing 30 and pressure builds causing movement of a conventional diaphragm (not shown) to move causing the actuating ball 26 to move in a direction opposite direction A in FIG. 4 away from the valve seat and engaged with the contact points 24 of the washer spring 10. This defines an open configuration of the spring-actuator assembly 28 so that fuel can flow through the regulator. Since the pleated body 12 defines fluid flow passages 36 (via opening 14) generally adjacent to the contact points 24 between the washer spring 10 and the actuating ball 26, fuel can flow though the passages 36 causing a dampening effect to thereby reduce noise of a regulator.

As the incoming fuel pressure is reduced, the force of a bias spring (not shown) overcomes the fuel pressure and returns the valve seat to seated engagement with the actuating ball 26, thus defining the closed configuration of the pressure regulator. Since the configuration of the washer spring 10 provides a spring function, the washer spring 10 biases the actuating ball 26 in the direction of arrow A and against the valve seat.

The washer spring 10 can also be used in place of the biasing member 90 in the regulator disclosed in U.S. Patent Publication No. 2006/0108006A1, the contents of which is hereby incorporated by reference into this specification. In this case, case the washer spring 10 biases the actuating ball 26 in the direction of arrow A to move the ball 26 against the valve seat (not shown). The balls 26 will lift from the seat when fuel pressure overcomes biasing force of the washer spring 10. The washer spring 10 can be used in fuel injector applications that require a biasing member that biases an actuating ball.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A spring-actuator assembly for a fuel pressure regulator, the assembly comprising:
   a housing,
   a washer spring received in the housing, the washer spring having a generally annular body with a top surface and a bottom surface, the body including an unobstructed, continuously annular opening there-through, the body including a plurality of pleats therein so that planar first faces of the top surface are disposed on a plane that is different from a plane of planar second faces of the top surface, at least certain first faces defining contact points, and
   an actuating member disposed at least partially in the opening and engaging the contact points of the certain first faces such that a fluid flow passage are defined between the washer spring and the actuating member,
   wherein the pleats extend in a continuous, linear manner radially from a periphery of the body to the opening.

2. The assembly of claim 1, wherein a third, transition face is provided between each first and second face of the washer spring.

3. The assembly of claim 1, wherein the actuating member is a spherical member.

4. The assembly of claim 1, wherein certain of the pleats are formed in the bottom surface of the body and other pleats are formed in the top surface of the body.

5. The assembly of claim 1, wherein the housing is constructed and arranged to be employed in a fuel pressure regulator.

6. The assembly of claim 1, wherein the body is made of sheet material.

7. The assembly of claim 1, wherein the housing has an opening communicating with the opening in the washer spring.

8. A spring-actuator assembly for a fuel pressure regulator, the assembly comprising:
   a washer spring received in the housing, the washer spring having a generally annular body including an unobstructed, continuously annular opening there-through, the body including a plurality of pleats and the body defining contact points, and
   an actuating member disposed at least partially in the opening and engaging the contact points so that fuel flow passages are defined adjacent to the contact points between the actuating member and the washer spring,
   wherein the pleats extend in a continuous, linear manner radially from a periphery of the body to the opening.

9. The assembly of claim 8, further including a housing receiving the washer spring.

10. The assembly of claim 9, wherein the housing is constructed and arranged to be employed in a fuel pressure regulator.

11. The assembly of claim 9, wherein the housing has an opening communicating with the opening in the washer spring.

12. The assembly of claim 8, wherein the body has a top surface and a bottom surface, the pleats being formed so that first faces of the top surface are disposed on a plane that is different from a plane of second faces of the top surface.

13. The assembly of claim 12, wherein a third, transition face is provided between each first and second face of the washer spring.

14. The assembly of claim 12, wherein certain of the pleats are formed in the bottom surface of the body and other pleats are formed in the top surface of the body.

15. The assembly of claim 8, wherein the actuating member is a spherical member.

16. The assembly of claim 8, wherein the body is made of sheet material.

17. A washer spring comprising:
   a generally annular body with a top surface and a bottom surface, the body including an unobstructed, continuously annular opening there-through,
   a plurality of pleats in the body so that that first faces of the top surface are disposed on a plane that is different from a plane of second faces of the top surface,
   wherein the pleats extend in a continuous, linear manner radially from a periphery of the body to the opening, and
   wherein a third, planar transition face is provided between each first and second face.

* * * * *